US009689595B2

(12) United States Patent
Zhan (10) Patent No.: US 9,689,595 B2
(45) Date of Patent: Jun. 27, 2017

(54) ELECTRONIC EXPANSION VALVE

(75) Inventor: Caiyi Zhan, Zhejiang (CN)

(73) Assignee: Zhejiang Sanhua Intelligent Controls Co., Ltd., Shaoxing, Zhejiang (CN)

( * ) Notice: Subject to any disclaimer, the term of this patent is extended or adjusted under 35 U.S.C. 154(b) by 288 days.

(21) Appl. No.: 14/399,502

(22) PCT Filed: Aug. 10, 2012

(86) PCT No.: PCT/CN2012/079933
§ 371 (c)(1),
(2), (4) Date: Nov. 6, 2014

(87) PCT Pub. No.: WO2013/170542
PCT Pub. Date: Nov. 21, 2013

(65) Prior Publication Data
US 2015/0121951 A1     May 7, 2015

(30) Foreign Application Priority Data
May 18, 2012  (CN) .......................... 2012 1 0155946

(51) Int. Cl.
*F25B 41/06* (2006.01)
*F16K 3/26* (2006.01)
(Continued)

(52) U.S. Cl.
CPC ............ *F25B 41/062* (2013.01); *F16K 3/265* (2013.01); *F16K 11/10* (2013.01); *F16K 27/02* (2013.01);
(Continued)

(58) Field of Classification Search
CPC .............. F25B 41/062; F25B 2341/061; F25B 2341/065; F16K 3/265; F16K 11/10;
(Continued)

(56) References Cited

U.S. PATENT DOCUMENTS

| 2,345,306 A | 3/1944 | Van Der Werff |
| 6,244,060 B1 * | 6/2001 | Takano .............. B60H 1/00914 62/196.4 |
| 2009/0293519 A1 * | 12/2009 | Hayashi ................ F25B 41/062 62/222 |
| 2009/0293520 A1 | 12/2009 | Hayashi et al. |

(Continued)

FOREIGN PATENT DOCUMENTS

| CN | 1132328 A | 10/1996 |
| CN | 1297518 A | 5/2001 |
| CN | 200968423 Y | 10/2007 |
| CN | 201327255 Y | 10/2009 |
| CN | 102042416 A | 5/2011 |
| CN | 102252119 A | 11/2011 |
| CN | 202182593 U | 4/2012 |
| JP | 4285155 B2 | 4/2009 |
| JP | A 2009287913 A | 12/2009 |

(Continued)

OTHER PUBLICATIONS

International Search Report dated Feb. 28, 2013 from corresponding International Application No. PCT/CN2012/079933.
(Continued)

*Primary Examiner* — Jessica Cahill
*Assistant Examiner* — Richard K Durden
(74) *Attorney, Agent, or Firm* — Wolf, Greenfield & Sacks, P.C.

(57) ABSTRACT

An electronic expansion valve is provided, the valve needle component thereof is provided with an axial mounting hole, the screw rod position limiting portion is mounted at the bottom end of the screw rod and extends into the axial mounting hole, and the valve needle position limiting portion is mounted at an open end of the axial mounting hole; and a distance between the bottom end of the screw rod and a bottom wall of the axial mounting hole forms the predetermined buffer distance. When the refrigerant flows reversely, the structural design of the electronic expansion valve may, on one hand, simplify the control procedure, and on the other hand, avoid the problem that a screw rod is stuck because a valve needle component is not removed in time.

15 Claims, 9 Drawing Sheets

(51) Int. Cl.
*F16K 11/10* (2006.01)
*F16K 27/02* (2006.01)

(52) U.S. Cl.
CPC ... *F25B 2341/061* (2013.01); *F25B 2341/065* (2013.01); *Y02B 30/72* (2013.01)

(58) Field of Classification Search
CPC ...... F16K 25/00; F16K 27/02; F16K 27/0257; F16K 27/0272; F16K 27/029; Y10T 137/86984; Y10T 137/87056; Y10T 137/8803; Y02B 30/72
USPC .............................. 137/614.17, 630.15, 636
See application file for complete search history.

(56) References Cited

U.S. PATENT DOCUMENTS

2011/0084224 A1* 4/2011 Zhan .................... F25B 41/062
251/129.01

FOREIGN PATENT DOCUMENTS

JP 2012047213 A 3/2012
KR 100552942 B1 2/2006

OTHER PUBLICATIONS

International Search Report dated Feb. 28, 2013 from potentially related International Application No. PCT/CN2012/079927.
International Search Report dated Feb. 28, 2013 from potentially related International Application No. PCT/CN2012/079930.

* cited by examiner

ELECTRONIC EXPANSION VALVE

The present application is the national phase of International Application No. PCT/CN2012/079933, filed on Aug. 10, 2012, which claims the benefit of priority to Chinese Patent Application No. 201210155946.6 titled "ELECTRONIC EXPANSION VALVE", filed with the Chinese State Intellectual Property Office on May 18, 2012, the entire disclosures of both applications are incorporated herein by reference.

TECHNICAL FIELD

The present application relates to the technical field of fluid control components, and particularly to an electronic expansion valve.

BACKGROUND

Figure 1:
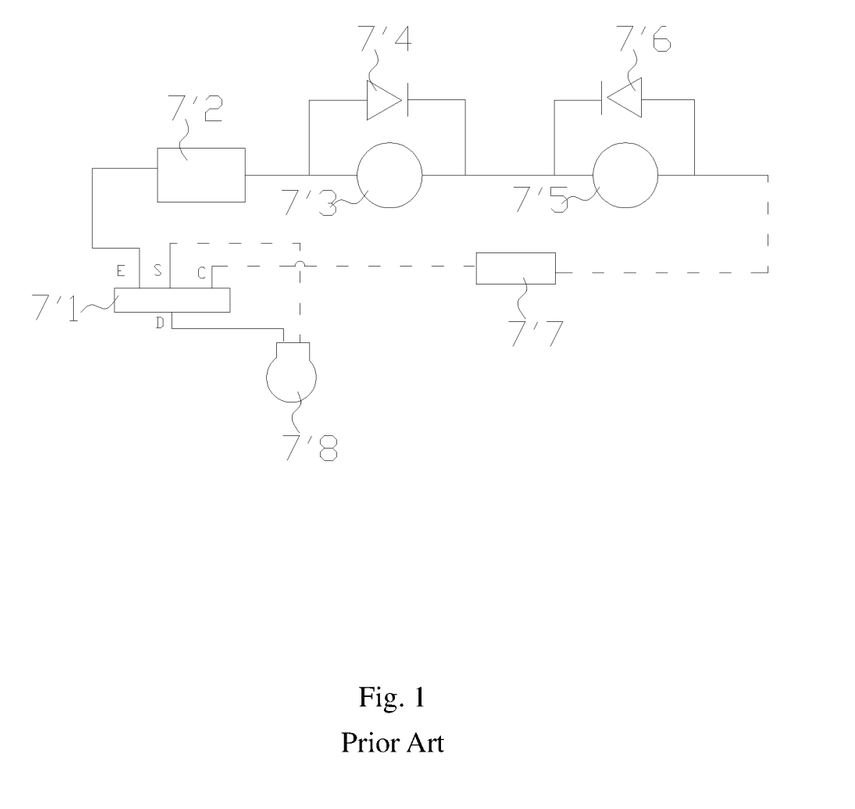
FIG. 1 is a schematic view showing the operating principle of an air conditioning refrigerating system in the conventional technology.

In the air conditioner market, two electronic expansion valves are employed since an indoor unit is disposed far away from an outdoor unit of an air conditioner. In addition, each of the two electronic expansion valves is required to be connected to a respective one-way valve in parallel to improve the system efficiency to the greatest extent. The schematic diagram of the system of the air conditioner is shown in FIG. 1, and the working principle is briefly described as follows.

The refrigerating operation is described as follows. Gaseous refrigerant with high temperature and high pressure which is discharged from a gas discharge pipe of a compressor 7'8 passes through, in turn, a connecting pipe D and a connecting pipe E of a four-way valve 7'1, an outdoor heat exchanger 7'2 (releasing heat by condensation), a first one-way valve 7'4 (here, a first electronic expansion valve 7'3 does not function to regulate the flow), and a second electronic expansion valve 7'5 (here, a second one-way valve 7'6 is closed, and the second electronic expansion valve 7'5 functions to regulate the flow), and finally enters into an indoor heat exchanger 7'7 to be evaporated, so as to absorb heat to realize the refrigerating function. Here, the second electronic expansion valve 7'6 is close to the indoor heat exchanger 7'7, thus the heat loss may be reduced (if the electronic expansion valve is too far away from the evaporator, the liquid refrigerant with low temperature and low pressure which is discharged from the electronic expansion valve is apt to be gasified, which not only causes heat loss, but also results in significant reduction of the utilization rate of the evaporator). Also, if the refrigerant with medium temperature and high pressure which is discharged from the outdoor heat exchanger 7'2 passes through the first electronic expansion valve 7'3, a throttling effect may still occur even when the expansion valve is fully opened, which reduces the pressure of the refrigerant, and then when the refrigerant is transferred to the second electronic expansion valve 7'5, it is apt to be gasified partly, therefore the throttling effect of the electronic expansion valve is adversely affected, and the system efficiency is reduced.

The heating operation is described as follows. Gaseous refrigerant with high temperature and high pressure which is discharged from the gas discharge pipe of the compressor 7'8 passes through, in turn, the connecting pipe D and a connecting pipe C of the four-way valve 7'1, the indoor heat exchanger 7'7 (releasing heat by condensation), the second one-way valve 7'6 (here, the second electronic expansion valve 7'5 does not function to regulate the flow), the first electronic expansion valve 7'3 (here, the first one-way valve 7'4 is closed, and the first electronic expansion valve 7'3 functions to regulate the flow), and finally enters into the outdoor heat exchanger 7'2 to be evaporated, so as to absorb heat to realize the refrigerating function. Here, the first electronic expansion valve 7'3 is close to the outdoor heat exchanger 7'2, thus the heat loss may be reduced (if the electronic expansion valve is too far away from the evaporator, the liquid refrigerant with low temperature and low pressure which is discharged from the electronic expansion valve is apt to be gasified, which not only causes heat loss, but also results in significant reduction of the utilization rate of the evaporator). Also, if the refrigerant with medium temperature and high pressure which is discharged from the indoor heat exchanger 7'7 passes through the second electronic expansion valve 7'5, the throttling effect may still occur even when the expansion valve is fully opened, which reduces the pressure of the refrigerant, and then when the refrigerant flows to the first electronic expansion valve 7'3, it is apt to be gasified partly, therefore the throttling effect of the electronic expansion valve is adversely affected, and the system efficiency is reduced.

However, in the current market, some customers require to integrate the one-way valve with the electronic expansion valve, so as to reduce the numbers of parts and solder joints, and to further improve the reliability of the system.

Figure 2:
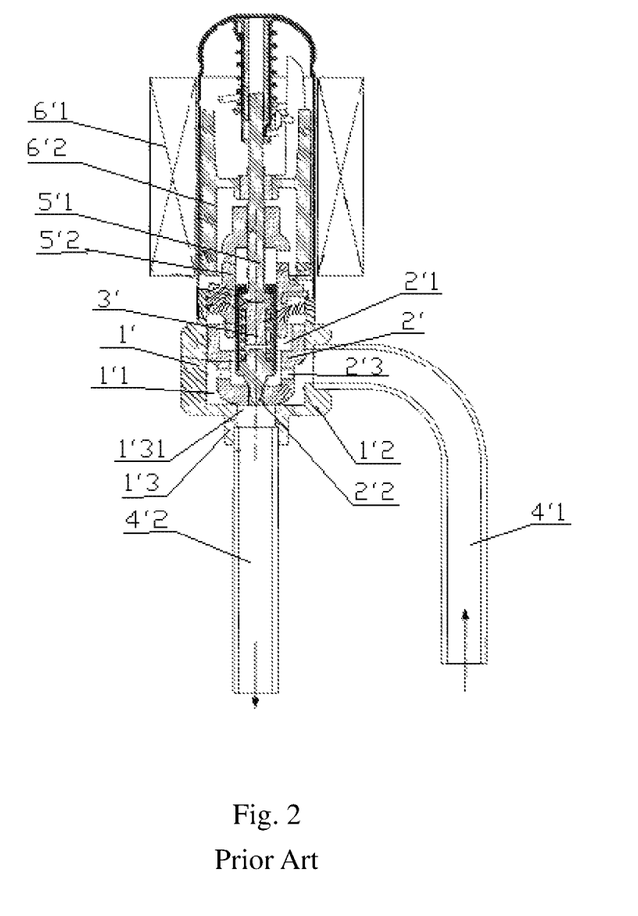
FIG. 2 is a schematic view showing the structure of an electronic expansion valve in the conventional technology which is performing a flow regulation when the refrigerant flows forwards.
Figure 3:
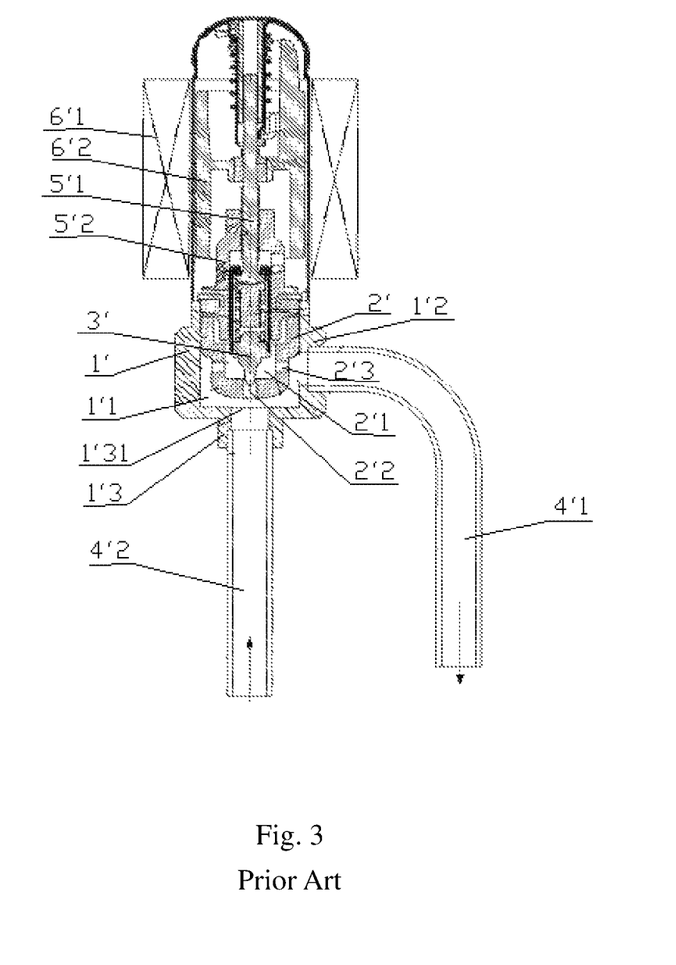
FIG. 3 is a schematic view showing the structure of the electronic expansion valve in the conventional technology, wherein the electronic expansion valve is opened when the refrigerant flows reversely.

In view of this, in the conventional technology, an electronic expansion valve with function of a one-way valve is disclosed in Japanese Patent Application Publication No. 2009-287913. Reference may be made to FIGS. 2 and 3. FIG. 2 is a schematic view showing the structure of an electronic expansion valve in the conventional technology which is performing a flow regulation when the refrigerant flows forwards; and FIG. 3 is a schematic view showing the structure of the electronic expansion valve in the conventional technology, wherein the electronic expansion valve is opened when the refrigerant flows reversely.

As shown in FIGS. 2 and 3, the electronic expansion valve in the conventional technology includes a valve seat 1'. The valve seat 1' is provided with a main valve cavity 1'1, a transverse connecting port 1'2 and a vertical connecting port 1'3, and an opening at an upper end of the vertical connecting port 1'3 forms a main valve port 1'31. A valve core seat 2' is provided inside the main valve cavity 1'1, and a circumferential side wall of the valve core seat 2' abuts against an inner circumferential side wall of the main valve cavity 1'1, thus the valve core seat 2' is guided by the main valve cavity 1'1 and may reciprocate along an axial direction of the main valve cavity 1'1, so as to open or close the main valve port 1'31. Further, as shown in FIGS. 2 and 3, the valve core seat 2' is provided with a secondary valve cavity 2'1, and a valve core valve port 2'2 in communication with the secondary valve cavity 2'1, and a valve needle component 3' extends into the secondary valve cavity 2'1 and reciprocates along an axial direction of the secondary valve cavity 2'1, so as to open or close the valve core valve port 2'2. Furthermore, as shown in FIGS. 2 and 3, the circumferential side wall of the valve core seat 2' is further provided with a communicating hole 2'3 in communication with the secondary valve cavity 2'1, and the communicating hole 2'3 faces the transverse connecting port 1'2, to allow the secondary valve cavity 2'1 to communicate with the transverse connecting port 1'2.

In addition, as shown in FIGS. 2 and 3, the transverse connecting port 1'2 is connected to a transverse connecting pipe 4'1, and the vertical connecting port 1'3 is connected to a vertical connecting pipe 4'2. The flow of the refrigerant fluid from the transverse connecting pipe 4'1 to the vertical connecting pipe 4'2 (i.e., a side of the transverse connecting port 1'2 is a high pressure zone, and a side of the vertical connecting port 1'3 is a low pressure zone) is defined as a forward flow, and the flow of the refrigerant fluid from the vertical connecting pipe 1'3 to the transverse connecting pipe 1'2 (i.e., the side of the vertical connecting port 1'3 is a high pressure zone, and the side of the transverse connecting port 1'2 is a low pressure zone) is defined as a reverse flow. The valve needle component 3' is connected to a screw rod 5'1, and the screw rod 5'1 cooperates with a nut 5'2 by screw threads. In such structure, a magnet 6'2 is rotated under the action of a magnetic field of a coil 6'1; and then the screw rod 5'1 is rotated and axially reciprocates due to the screw-thread fit with the nut 5'2, thereby driving the valve needle component 3' to reciprocate axially to open and close the valve bore valve port 2'2.

As shown in FIG. 2, when the refrigerant flows forward, the side of the transverse connecting port 1'2 is the high pressure zone, and the side of the vertical connecting port 1'3 is the low pressure zone. The valve core seat 2' moves downward under the action of a pressure difference of the refrigerant, thereby closing the main valve port 1'31. On this basis, the refrigerant enters into the secondary valve cavity 2'1 from the transverse connecting port 1'2 through the communicating hole 2'3, the valve needle component 3' opens the valve core valve port 2'2, and the refrigerant entered into the secondary valve cavity 2'1 flows to the vertical connecting port 1'3 via the valve core valve port 2'2, and in turn flows into the vertical connecting pipe 4'2. In this operation, the screw rod 5'1 moves axially to allow the valve needle component 3' to regulate an opening of the valve core valve port 2'2, thereby achieving an object of flow regulation of the electronic expansion valve.

As shown in FIG. 3, when the refrigerant flows reversely, the side of the vertical connecting port 1'3 is the high pressure zone, and the side of the transverse connecting port 1'2 is the low pressure zone. Here, the valve core seat 2' is pushed to move upward under the action of the pressure difference of the refrigerant, thereby opening the main valve port 1'31. The refrigerant flows through the main valve port 1'31, the main valve cavity 1'1 and the transverse connecting port 1'2 to the transverse connecting pipe 4'1, thereby achieving the function of one-way communication of the one-way valve.

However, the above electronic expansion valve in the conventional technology has the following defects.

Firstly, when the refrigerant flows reversely, the valve core seat 2' moves upward to open the main valve port 1'31, here, the screw rod 5'1 is required to move upward in an axial direction to remove the valve needle component 3' in advance, therefore, the procedure control is relatively complicated. Further, when the valve needle component 3' is not removed timely, the upward pressure subjected by the valve core seat 2' may be transferred to the valve needle component 3', which may further cause a large friction to the screw rod 5'1, and the screw rod 5'1 may be stuck due to the friction.

Second, as shown in FIG. 2, when the refrigerant flows forwards, the side wall of the valve core seat 2' faces the transverse connecting port 1'2, thus the circumferential side wall of the valve core seat 2' may be impacted by the refrigerant with high pressure. When the pressure of the refrigerant fluctuates, an eccentricity of the valve core seat 2' may be caused, thus the valve core seat 2' can not tightly seal the main valve port 1'31, which causes a large internal leakage, and adversely affects the working performance of the system. Furthermore, the eccentricity of the valve core seat 2' may cause interference between the valve needle component 3' and the valve core valve port 2'2.

SUMMARY

One technical problem to be solved by the present application is to provide an electronic expansion valve. When the refrigerant flows reversely, the structural design of the electronic expansion valve may, on one hand, simplify the control procedure, and on the other hand, avoid the problem that a screw rod is stuck because a valve needle component is not removed in time, thus a valve core seat may open a main valve port smoothly, and the operational reliability is improved.

To solve the above technical problems, an electronic expansion valve is provided according to the present application, which includes a valve seat, a vertical connecting pipe and a transverse connecting pipe, the valve seat being provided with a main valve cavity; wherein the electronic expansion valve further includes a main valve port in communication with the vertical connecting pipe and a valve core seat configured to open and close the main valve port, and the valve core seat is provided with a valve core valve port which allows a communication with the vertical connecting pipe; and the electronic expansion valve further includes a valve needle component configured to open and close the valve core valve port, and a drive component configured to drive the valve needle component to reciprocate, and the drive component includes a screw rod connected to the valve needle component, and a nut which cooperates with the screw rod by screw threads;

in a case that a refrigerant flows forward, the valve core seat closes the main valve port, and the refrigerant flows to the vertical connecting pipe via the valve core valve port, and the valve needle component is driven by the drive component to regulate an opening of the valve core valve port;

in a case that the refrigerant flows reversely, the valve core seat moves upward to open the main valve port, the valve needle component closes the valve core valve port, and the refrigerant flows to the transverse connecting pipe via the main valve port; and wherein a screw rod position limiting portion is mounted at a bottom end of the screw rod, and the valve needle component is provided with a valve needle position limiting portion configured to retain the screw rod position limiting portion; and an elastic component which is compressed is further provided between the screw rod and the valve needle component; and the screw rod and the valve needle component are movable with respect to each other in a predetermined buffer distance, and in a case that the refrigerant flows reversely, the valve core seat moves upward to push the valve needle component to move with respect to the screw rod, to allow the valve core seat to open the main valve port.

Preferably, the valve needle component is provided with an axial mounting hole, the screw rod position limiting portion is mounted at the bottom end of the screw rod and extends into the axial mounting hole, and the valve needle position limiting portion is mounted at an open end of the axial mounting hole; and a distance between the bottom end of the screw rod and a bottom wall of the axial mounting hole forms the predetermined buffer distance.

Preferably, an outer wall of the valve needle component is provided with a valve needle stepped portion, the elastic component is sleeved on the outer wall of the valve needle component and has a lower end supported on the valve needle stepped portion; and a movable position limiting plate is sleeved on the screw rod at a portion outside the axial mounting hole, and when moving upward to an upper limit position, the position limiting plate abuts against a screw rod stepped portion of the screw rod; and an upper end of the elastic component abuts against the position limiting plate.

Preferably, the valve needle position limiting portion includes a cylindrical guide portion, a top end of the cylindrical guide portion is provided with a bent portion which is bent outwards, and the bent portion abuts against a top-end wall of the axial mounting hole; and the bottom end of the screw rod is guided to pass through the cylindrical guide portion, and a bottom wall of the cylindrical guide portion is configured to retain the screw rod position limiting portion.

Preferably, the elastic component is arranged inside the axial mounting hole, and has an upper end abutting against the screw rod position limiting portion, and a lower end supported on the bottom wall of the axial mounting hole.

Preferably, the valve needle position limiting portion is a retaining block fixedly arranged on an inner wall of the axial mounting hole at the open end.

Preferably, the predetermined buffer distance ranges from 1 mm to 5 mm.

Preferably, a sleeve is fixed in the main valve cavity, and the valve core seat is axially movably arranged in the sleeve, and a lower portion of the valve needle component extends into the sleeve to open and close the valve core valve port; and a circumferential side wall of the sleeve is provided with a first communicating hole close to the main valve port and a second communicating hole away from the main valve port; in a case that the refrigerant flows forwards, the valve core seat closes the main valve port, and the communication between the first communicating hole and the main valve port is disconnected, and meanwhile a sleeve upper cavity comes in communication with the main valve cavity through the second communicating hole; and in a case that the refrigerant flows reversely, the valve core seat moves upward to open the main valve port, and the main valve port comes in communication with the main valve cavity through the first communicating hole.

Preferably, when the valve core seat moves upward to open the main valve port, the valve needle component closes the valve core valve port, and the valve core seat closes the second communicating hole at the same time to disconnect the communication between the sleeve upper cavity and the main valve cavity.

Preferably, a lower end of the sleeve is supported by the valve seat, and the lower end of the sleeve surrounds the main valve port.

Preferably, the valve seat is provided with a vertical connecting port for mounting the vertical connecting pipe, and the lower end of the sleeve extends into the vertical connecting port and is supported by the vertical connecting port; and an inner wall of the lower end of the sleeve forms a main valve hole, and the main valve port is formed by an aperture at an upper portion of the main valve hole.

Based on the conventional technology, in the electronic expansion valve according to the present application, a screw rod position limiting portion is mounted at a bottom end of the screw rod, and the valve needle component is provided with a valve needle position limiting portion for retaining the screw rod position limiting portion. An elastic component which is compressed is further provided between the screw rod and the valve needle component. The screw rod and the valve needle component are movable with respect to each other within a predetermined buffer distance, thus, when the refrigerant flows reversely, the valve core seat moves upward to push the valve needle component to move with respect to the screw rod, thereby allowing the valve core seat to open the main valve port.

The valve needle component is provided with an axial mounting hole, the screw rod position limiting portion is mounted at a bottom end of the screw rod and extends into the axial mounting hole, and the valve needle position limiting portion is mounted at an open end of the axial mounting hole. A distance between the bottom end of the screw rod and a bottom wall of the axial mounting hole forms the predetermined buffer distance.

When the refrigerant flows reversely, under the premise that the drive component does not move and the screw rod does not move upward along the axial direction, the valve core seat moves upward due to the pushing of the pressure of the refrigerant, and since the floatable connection between the valve needle component and the screw rod has a predetermined buffer distance, the valve core seat may push the valve needle component to move upward, and the valve needle component makes a sufficient upward relative displacement with respect to the screw rod. The relative displacement is less than or equal to the predetermined buffer distance, thereby allowing the valve core seat to open the main valve port smoothly.

In the above operation, due to the predetermined buffer distance between the screw rod and the valve needle component, when the valve needle component makes a sufficient relative displacement with respect to the screw rod, the relative displacement is smaller than the predetermined buffer distance, thereby allowing the main valve port to be opened smoothly. Also, since no rigid contact will occur between the valve needle component and the screw rod, the thrust pressure on the valve core seat from the refrigerant would not be transferred to the screw rod through the valve needle component, thereby avoiding the problem that the screw rod is stuck due to an overly large friction force. Furthermore, since it is not required to drive the screw rod to remove the valve needle component in advance, the control procedure of the electronic expansion valve is simplified as well.

In summary, the electronic expansion valve according to the present application may, on one hand, simplify the control procedure, and on the other hand, avoid the problem that a screw rod is stuck because a valve needle component is not removed in time, thus a valve core seat may open a main valve port smoothly, and the operational reliability is improved.

BRIEF DESCRIPTION OF THE DRAWINGS

FIG. 4-1 is a partially enlarged view showing a part A in FIG. 4;

FIG. 6-1 is a partially enlarged view showing a part B in FIG. 6; and

Corresponding relationships between reference numerals and components in FIGS. 1 to 3 are as follows:

| | | | |
|---|---|---|---|
| 1' | valve seat, | 1'1 | main valve cavity, |
| 1'2 | transverse connecting port, | 1'3 | vertical connecting port; |
| 1'31 | main valve port; | 2' | valve core seat, |
| 2'1 | secondary valve cavity, | 2'2 | valve core valve port, |
| 2'3 | communicating hole; | 3' | valve needle component; |
| 4'1 | transverse connecting pipe, | 4'2 | vertical connecting pipe; |
| 5'1 | screw rod, | 5'2 | nut; |
| 6'1 | coil, | 6'2 | magnet; |
| 7'1 | four-way valve, | 7'2 | outdoor heat exchanger, |
| 7'3 | first electronic expansion valve, | 7'4 | first one-way valve, |
| 7'5 | second electronic expansion valve, | 7'6 | second one-way valve, |
| 7'7 | indoor heat exchanger, and | 7'8 | compressor. |

Corresponding relationships between reference numerals and components in FIGS. 4 to 7 are as follows:

| | | | |
|---|---|---|---|
| 1 | valve seat, | 11 | main valve cavity, |
| 12 | transverse connecting port, | 13 | vertical connecting port; |
| 2 | valve core seat, | 21 | valve core valve port; |
| 3 | valve needle component, | 31 | axial mounting hole, |
| 32 | valve needle position limiting portion, | 321 | cylindrical guide portion, |
| 322 | bent portion, | 33 | valve needle stepped portion; |
| 4 | sleeve, | 41 | first communicating hole, |
| 42 | second communicating hole, | 43 | sleeve upper cavity, |
| 44 | main valve hole, | 441 | main valve port; |
| 51 | vertical connecting pipe, | 52 | transverse connecting pipe; |
| 61 | screw rod, | 611 | screw rod position limiting portion, |
| 612 | screw rod stepped portion, | 62 | nut, |
| 63 | position limiting plate; | 71 | magnet, and |
| 72 | elastic component. | | |

DETAILED DESCRIPTION

An object of the present application is to provide an electronic expansion valve. When the refrigerant flows reversely, the structural design of the electronic expansion valve may, on one hand, simplify the control procedure, and on the other hand, avoid the problem that a screw rod is stuck because a valve needle component is not removed in time, thus a valve core seat may open a main valve port smoothly, and the operational reliability is improved.

Figure 4:
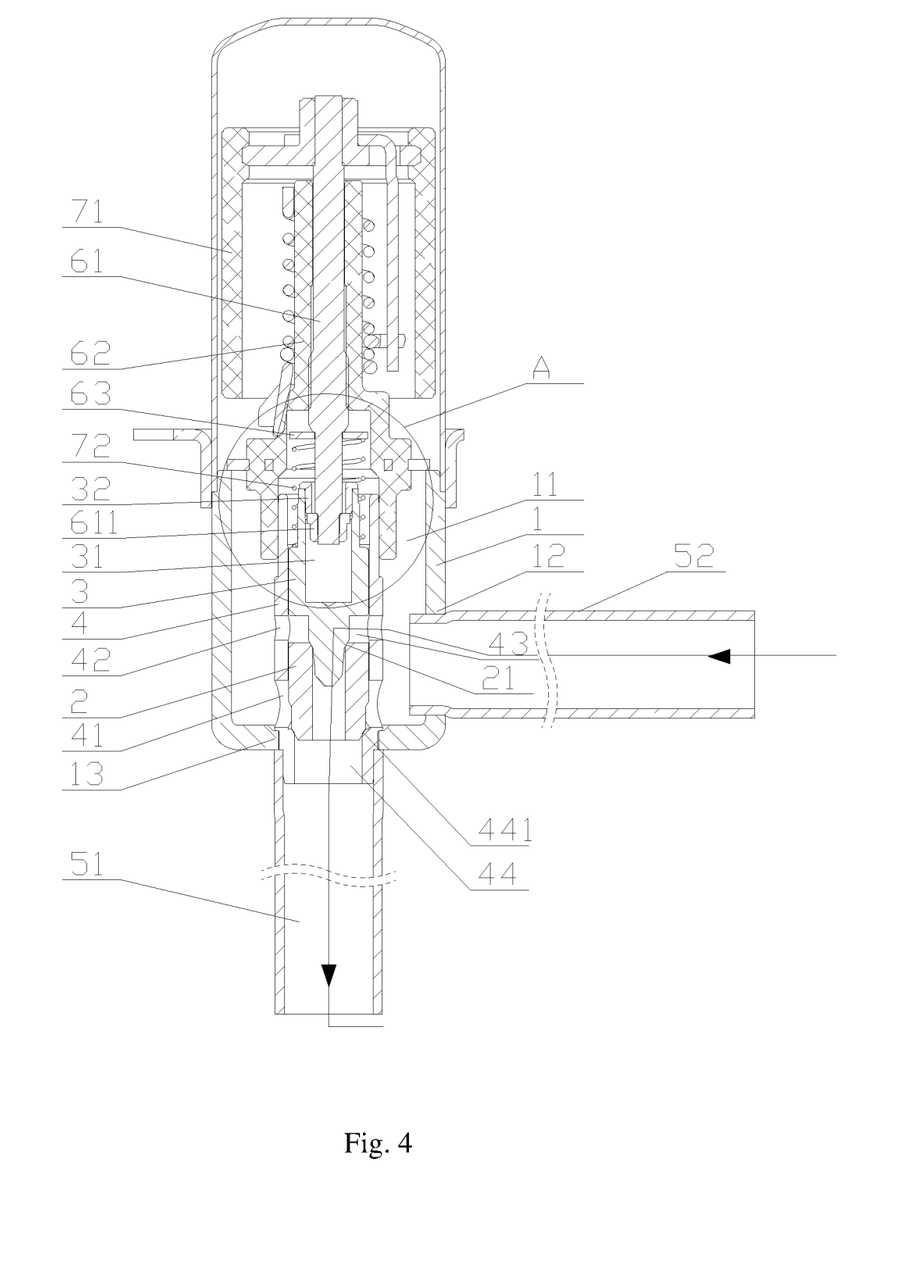
FIG. 4 is a schematic view showing the structure of an electronic expansion valve according to a first embodiment of the present application when the refrigerant flows forwards.
Figure 5:
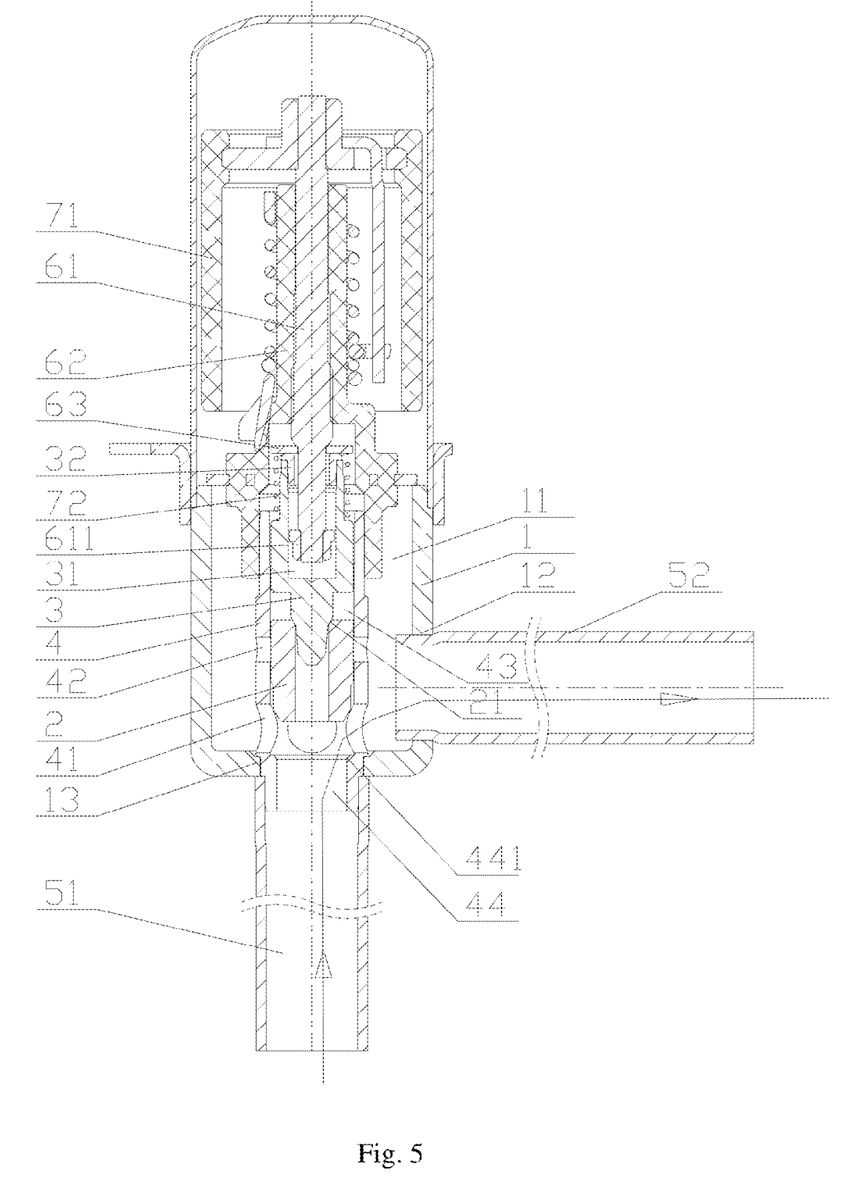
FIG. 5 is a schematic view showing the structure of the electronic expansion valve according to the first embodiment of the present application when the refrigerant flows reversely.
Figure 41:
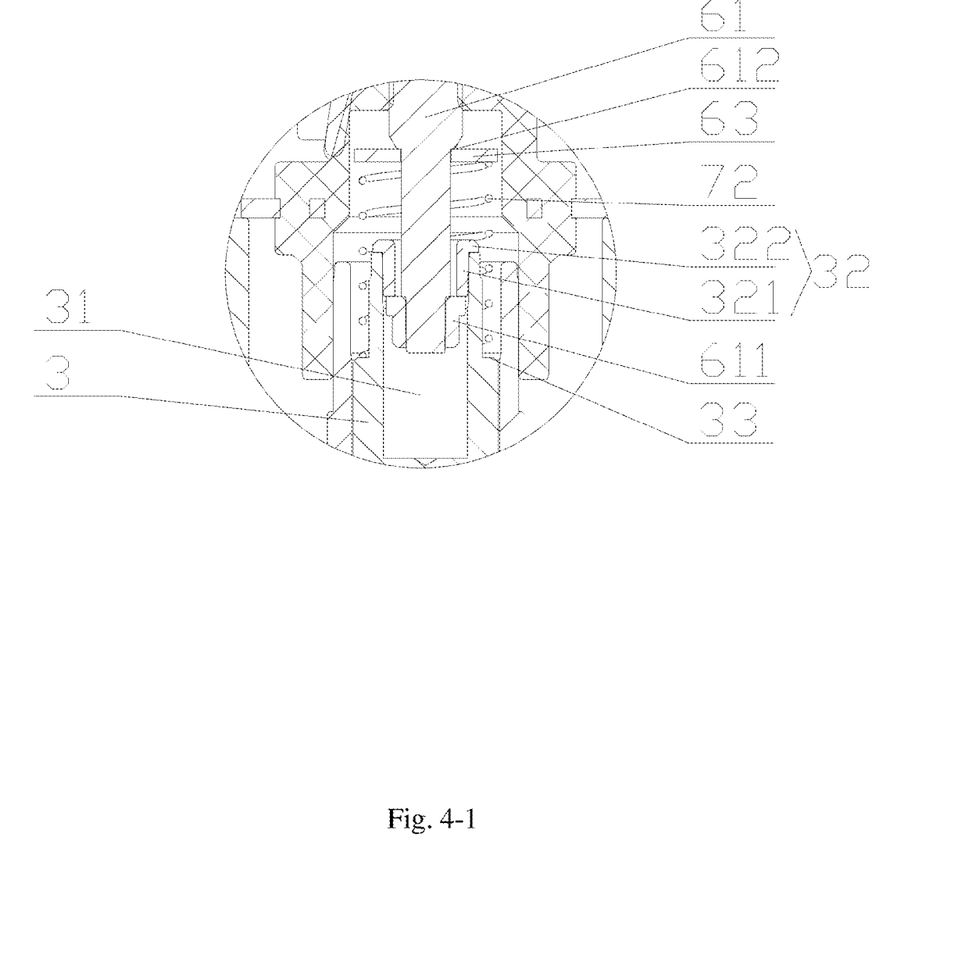

Reference is made to FIGS. 4, 4-1 and 5. FIG. 4 is a schematic view showing the structure of an electronic expansion valve according to a first embodiment of the present application when the refrigerant flows forwards; FIG. 4-1 is a partially enlarged view showing a part A in FIG. 4; and FIG. 5 is a schematic view showing the structure of the electronic expansion valve according to the first embodiment of the present application when the refrigerant flows reversely.

In a basic technical solution, as shown in FIGS. 4 and 5, the electronic expansion valve according to the present application includes a valve seat 1, a vertical connecting pipe 51 and a transverse connecting pipe 52. The valve seat 1 is provided with a vertical connecting port 13 and a transverse connecting port 12, the vertical connecting pipe 51 is mounted at the vertical connecting port 13, and the transverse connecting pipe 52 is mounted at the transverse connecting port 12. The valve seat 1 is provided with a main valve cavity 11. The electronic expansion valve further includes a main valve port 441 in communication with the vertical connecting pipe 51, and a valve core seat 2 configured to open and close the main valve port 441. The valve core seat 2 is provided with a valve core valve port 21 which allows a communication with the vertical connecting pipe 51. The electronic expansion valve further includes a valve needle component 3 configured to open and close the valve core valve port 21, and a drive component configured to drive the valve needle component to reciprocate. The drive component includes a screw rod 61 connected to the valve needle component, and a nut 62 which cooperates with the screw rod 61 by screw threads. The drive component further includes a magnet 71, and under the action of a magnetic field force of a coil, the magnet 71 drives the screw rod 61 to rotate.

As shown in FIG. 4, when the refrigerant flows forwards, the valve core seat 2 closes the main valve port 441, and the refrigerant flows to the vertical connecting pipe 51 via the valve core valve port 21, thus the valve needle component 3 may be driven by the drive component to regulate an opening of the valve core valve port 21. As shown in FIG. 5, when the refrigerant flows reversely, the valve core seat 2 moves upward to open the main valve port 441, and the valve needle component 3 closes the valve core valve port 21, and then the refrigerant flows to the transverse connecting pipe 52 via the main valve port 441.

Reference is made to FIGS. 4, 4-1 and 5, on basis of the above structure, a screw rod position limiting portion 611 is mounted at a bottom end of the screw rod 61, and the valve needle component 3 is provided with a valve needle position limiting portion 32 for retaining the screw rod position limiting portion 611. An elastic component 72 which is compressed is further provided between the screw rod 61 and the valve needle component 3. The screw rod 61 and the valve needle component 3 are movable with respect to each other within a predetermined buffer distance, thus, when the refrigerant flows reversely, the valve core seat 2 moves upward to push the valve needle component 3 to move with respect to the screw rod 61, thereby allowing the valve core seat 2 to open the main valve port 441.

It is to be noted that, any structure that allows the screw rod and the valve needle component to move with respect to each other under the support of an elastic component is deemed to fall in the scope of the present application. Apparently, a structure may be designed specifically. For example, as shown in FIGS. 4 and 4-1, the valve needle component 3 is provided with an axial mounting hole 31, the screw rod position limiting portion 611 is mounted at a bottom end of the screw rod 61 and extends into the axial mounting hole 31, and the valve needle position limiting portion 32 is mounted at an open end of the axial mounting hole 31. A distance between the bottom end of the screw rod 61 and a bottom wall of the axial mounting hole 31 forms the predetermined buffer distance.

In the above operation, due to the predetermined buffer distance between the screw rod 61 and the valve needle component 3, when the valve needle component 3 makes a sufficient relative displacement with respect to the screw rod 61, the relative displacement is smaller than the predetermined buffer distance, thereby allowing the main valve port 441 to be opened smoothly. Also, since no rigid contact will occur between the valve needle component 3 and the screw rod 61, the thrust pressure on the valve core seat 2 from the refrigerant would not be transferred to the screw rod 61 through the valve needle component 3, thereby avoiding the problem that the screw rod 61 is stuck due to an overly large friction force. Furthermore, since it is not required to drive the screw rod 61 to remove the valve needle component 3 in advance, the control procedure of the electronic expansion valve is simplified as well.

It is to be noted that, the present application is to make an improvement on the structure of connection between the valve needle component 3 and the screw rod 61, and therefore, whether the electronic expansion valve in FIGS. 2 and 3 in the conventional technology (without using a fixed sleeve, and solely the valve core seat 2' moves in the main valve cavity 1'1), or the electronic expansion valve in FIGS. 4 and 5 (with a fixed sleeve 4, and the valve seat 2 moves in the sleeve 4) should be deemed to fall in the scope of the present application as long as they employ the structure of connection between the screw rod 61 and the valve needle component 3 according to the present application.

A first embodiment of the present application may be achieved by making further improvements on the above basic technical solution. As shown in FIGS. 4, 4-1 and 5, an outer wall of the valve needle component 3 is provided with a valve needle stepped portion 33, and the elastic component 72 is sleeved on the outer wall of the valve needle component 3, and has a lower end supported on the valve needle stepped portion 33. A movable position limiting plate 63 is sleeved on the screw rod 61 at a portion outside the axial mounting hole 31. When moving upward to an upper limit position, the position limiting plate 63 abuts against a screw rod stepped portion 612 of the screw rod 61, and an upper end of the elastic component 72 abuts against the position limiting plate 63.

When the refrigerant flows reversely, the valve core seat 2 pushes the valve needle component 3 to move upwards, and the elastic component 72 has one end supported on the valve needle stepped portion 33 and the other end abutting against the position limiting plate 63, thus the elastic component 72 is compressed as the valve needle component 3 moves with respect to the screw rod 61. Furthermore, it is to be noted that, in this embodiment, since the elastic component 72 is arranged outside the valve needle component 3, no elastic component is provided inside the valve needle component 3, thereby simplifying the structure of the valve needle component 3 and reducing the manufacture cost.

In the first embodiment, the valve needle position limiting portion 32 may be designed specifically. For example, as shown in FIG. 4-1, the valve needle position limiting portion 32 includes a cylindrical guide portion 321, a top end of the cylindrical guide portion 321 is provided with a bent portion 322 which is bent outwards, and the bent portion 322 abuts against a top-end wall of the axial mounting hole 31. The bottom end of the screw rod 61 is guided to pass through the cylindrical guide portion 321, and a bottom wall of the cylindrical guide portion 321 retains the screw rod position limiting portion 611. In such structure, the cylindrical guide portion 321 may function to guide the screw rod 61, to allow the axial movement of the screw rod 61 to be smoother. Furthermore, the bent portion 322 abuts against the top-end wall of the axial mounting hole 31, thus the valve needle position limiting portion 32 is stably mounted at the open end of the axial mounting hole 31.

Figure 6:
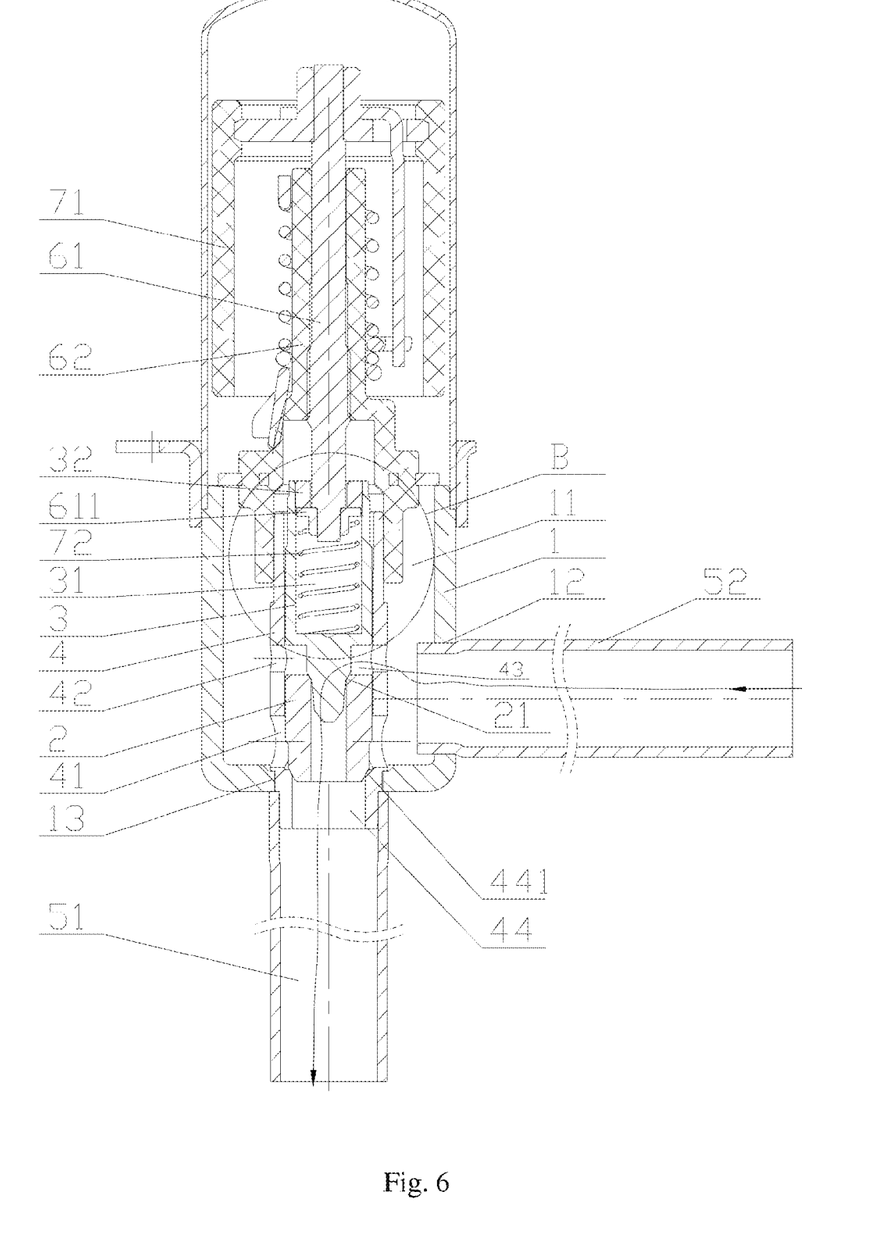
FIG. 6 is a schematic view showing the structure of an electronic expansion valve according to a second embodiment of the present application when the refrigerant flows forwards.
Figure 7:
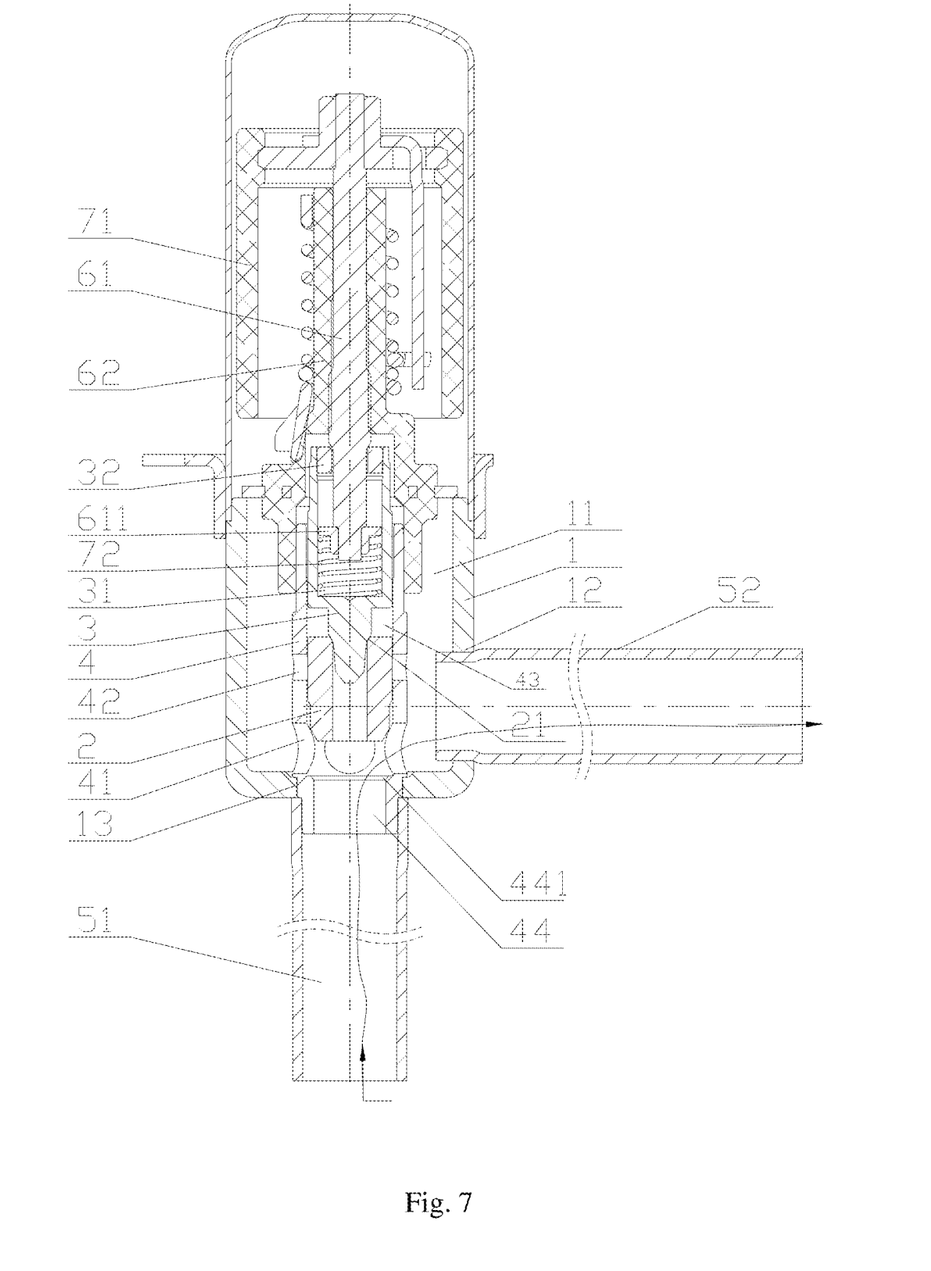
FIG. 7 is a schematic view showing the structure of the electronic expansion valve according to the second embodiment of the present application when the refrigerant flows reversely.
Figure 61:
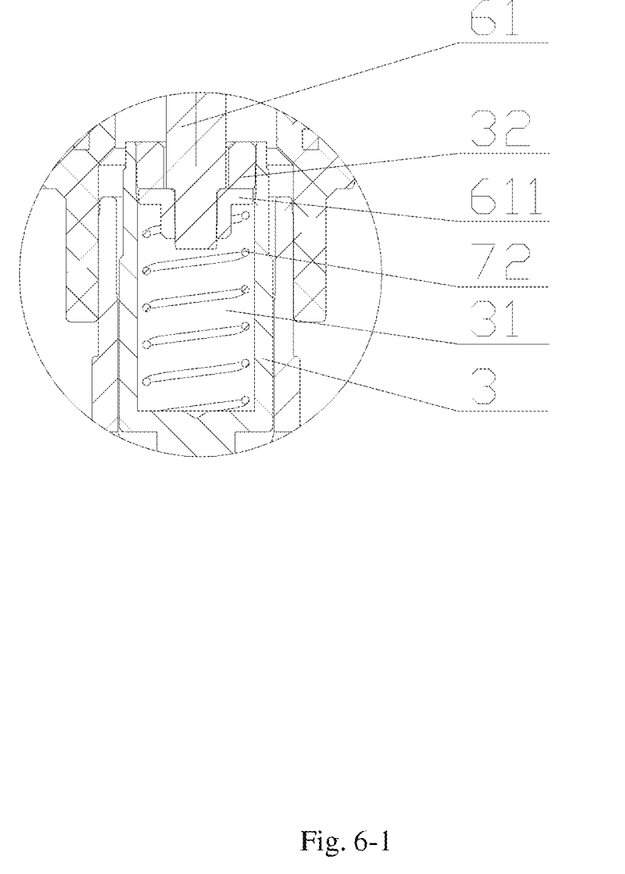

Further, a second embodiment of the present application may be achieved by making further improvement on the above basic technical solution. Reference is made to FIGS. 6, 6-1 and 7. FIG. 6 is a schematic view showing the structure of an electronic expansion valve according to the second embodiment of the present application when the refrigerant flows forwards; FIG. 6-1 is a partially enlarged view showing a part B in FIG. 6; and FIG. 7 is a schematic view showing the structure of the electronic expansion valve according to the second embodiment of the present application when the refrigerant flows reversely.

In the second embodiment, as shown in FIGS. 6, 6-1, and 7, the elastic component 72 is arranged inside the axial mounting hole 31. The elastic component 72 has an upper end abutting against the screw rod position limiting portion 611, and a lower end supported on the bottom wall of the axial mounting hole 31. Apparently, such structure may also solve the technical problem and achieve the object of the present application.

Further, as shown in FIG. 6-1, the valve needle position limiting portion 32 may be an annular retaining block fixedly arranged on an inner wall of the axial mounting hole 31 at the open end. The annular retaining block may be fixed at the open end of the axial mounting hole 31 by interference fit or welding. On the basis of ensuring the working performance, the annular retaining block has a relatively simple structure and thus having a low manufacture cost.

In any one of the above technical solutions, the predetermined buffer distance may be designed specifically. The predetermined buffer distance may range from 1 mm to 5 mm. Apparently, the predetermined buffer distance is not limited to this, and it has the following meaning: when the refrigerant flows reversely, assuming that a distance by which the valve core seat 2 is required to move upward to smoothly open the main valve port 441 is H, the predetermined buffer distance is required to be greater than H.

Based on any one of the above technical solutions, further improvements may also be made.

As shown in FIGS. 4, 5, 6 and 7, a sleeve 4 is fixed in the main valve cavity 11, the valve core seat 2 is axially movably arranged in the sleeve 4, and a lower portion of the valve needle component 3 extends into the sleeve 4 to open and close the valve core valve port 21. A circumferential side wall of the sleeve 4 is provided with a first communicating hole 41 close to the main valve port 441 and a second communicating hole 42 away from the main valve port 441. When the refrigerant flows forwards, the valve core seat 2 closes the main valve port 441, and the communication between the first communicating hole 41 and the main valve port 441 is disconnected, and meanwhile a sleeve upper cavity 43 comes in communication with the main valve cavity 11 via the second communicating hole 42. When the refrigerant flows reversely, the valve core seat 2 moves upward to open the main valve port 441, and the main valve port 441 comes in communication with the main valve cavity 11 via the first communicating hole 41.

As shown in FIGS. 4 and 6, when the refrigerant flows forwards, the side of the transverse connecting pipe 52 is a high pressure zone, and the side of the vertical connecting pipe 51 is a low pressure zone. The valve core seat 2 moves downward under the action of a pressure difference of the refrigerant to close the main valve port 441. On this basis, the refrigerant enters into the sleeve upper cavity 43 via the second communicating hole 42, and when the valve needle component 3 opens the valve core valve port 21, the refrigerant in turn enters into the side of the vertical connecting pipe 51 via the valve core valve port 21. In this process, the valve needle component 3 may reciprocate axially with the screw rod 61, thereby regulating an opening of the valve core valve port 21, and achieving the object of flow regulation of the electronic expansion valve.

As shown in FIGS. 5 and 7, when the refrigerant flows reversely, the side of the vertical connecting pipe 51 is a high pressure zone, and the side of the transverse connecting pipe 52 is a low pressure zone. The valve core seat 2 moves upward under the action of the pressure difference of the refrigerant, thereby opening the main valve port 441. The refrigerant passes through the main valve port 441, and then flows to the side of the transverse connecting pipe 52 via the first communicating hole 41, thereby achieving the object of one-way communication of a one-way valve.

In the above operation, when the refrigerant flows forwards, the valve core seat 2 is arranged in the sleeve 4, and the sleeve 4 is fixedly arranged in the main valve cavity 11, thus the pressure impact on the valve core seat 2 from the high pressure refrigerant is largely borne by the sleeve 4, which significantly reduces the impact on the valve core seat 2, thereby preventing the eccentricity of the valve core seat 2, and avoiding an internal leakage, and ensuring the reliability of the operation of the system.

In the above technical solution, further improvements may be made. For example, as shown in FIGS. 5 and 7, when the valve core seat 2 opens the main valve port 441, the valve core seat 2 closes the second communicating hole 42 at the same time, so as to disconnect the communication between the sleeve upper cavity 43 and the main valve cavity 11. In such structure, when the refrigerant flows reversely as shown in FIGS. 5 and 7, the valve core seat 2 moves upward and at the same time closes the second communicating hole 42, thus the refrigerant will not enter into the sleeve upper cavity 43 via the second communicating hole 42, and a refrigerant pressure which drives the valve core seat 2 to move downward will not be generated, thereby improving the sensitivity of the operation of the valve core seat 2 opening the main valve port 441.

In the above technical solution, the manner for forming the main valve port 441 may be specifically designed. For example, as shown in FIG. 5, the lower end of the sleeve 4 extends into the vertical connecting port 13, and is supported by the vertical connecting port 13. An inner wall of the lower end of the sleeve 4 forms a main valve hole 44, and an aperture at an upper portion of the main valve hole 44 forms the main valve port 441. In such structure, the main valve port 441 is formed on the inner wall of the sleeve 4, and compared to the structure of the main valve port 441 being arranged in the valve seat 1, such structure may facilitate ensuring the concentricity between the valve core seat 2 in the sleeve 4 and the main valve port 441, thereby facilitating improving the sealing performance.

Apparently, the manners for forming the main valve port 441 are not limited in the present application, and as described above, any one of formation structures of the main valve port should be deemed to fall within the scope of the present application as long as the valve core seat 2 movable up and down in the sleeve 4 may close and open the main valve port. For example, the main valve port 441 may be formed by an aperture at an upper end of the vertical connecting port 13 as shown in FIGS. 2 and 3, and in such structure, the lower end of the sleeve 4 does not extend into the vertical connecting port 13, but is supported on an inner wall of the valve seat 1 around the vertical connecting port 13, therefore the valve core seat 2 movable in the sleeve 4 may still open and close the main valve port. Apparently, in such structure, in order to fix the sleeve 4 reliably, the inner wall of the valve seat 1 may be provided with a mounting groove surrounding the main valve port, and the lower end of the sleeve 4 may be fixed in the mounting groove.

An electronic expansion valve according to the present application is described in detail hereinbefore. The principle and the embodiments of the present application are illustrated herein by specific examples. The above description of examples is only intended to help the understanding of the method and idea of the present application. It should be noted that, for the person skilled in the art, a few of modifications and improvements may be made to the present application without departing from the principle of the present application, and these modifications and improvements are also deemed to fall into the scope of the present application defined by the claims.

The invention claimed is:

1. An electronic expansion valve, comprising a valve seat, a vertical connecting pipe and a transverse connecting pipe, the valve seat being provided with a main valve cavity; wherein the electronic expansion valve further comprises a main valve port in communication with the vertical connecting pipe and a valve core seat configured to open and close the main valve port, and the valve core seat is provided with a valve core valve port which allows a communication with the vertical connecting pipe; and the electronic expansion valve further comprises a valve needle component configured to open and close the valve core valve port, and a drive component configured to drive the valve needle component to reciprocate, and the drive component comprises a screw rod connected to the valve needle component, and a nut which cooperates with the screw rod by screw threads;

in a case that a refrigerant flows forward, the valve core seat closes the main valve port, and the refrigerant flows to the vertical connecting pipe via the valve core valve port, and the valve needle component is driven by the drive component to regulate an opening of the valve core valve port;

in a case that the refrigerant flows reversely, the valve core seat moves upward to open the main valve port, the valve needle component closes the valve core valve port, and the refrigerant flows to the transverse connecting pipe via the main valve port; and wherein a screw rod position limiting portion is mounted at a bottom end of the screw rod, and the valve needle component is provided with a valve needle position limiting portion configured to retain the screw rod position limiting portion; and an elastic component which is compressed is further provided between the screw rod and the valve needle component; and the screw rod and the valve needle component are movable with respect to each other in a predetermined buffer distance, and in a case that the refrigerant flows reversely, the valve core seat moves upward to push the valve needle component to move with respect to the screw rod, to allow the valve core seat to open the main valve port; and wherein a sleeve is fixed in the main valve cavity, and the valve core seat is axially movably arranged in the sleeve, and a lower portion of the valve needle component extends into the sleeve to open and close the valve core valve port; and a circumferential side wall of the sleeve is provided with a first communicating hole close to the main valve port and a second communicating hole away from the main valve port; in a case that the refrigerant flows forwards, the valve core seat closes the main valve port, and the communication between the first communicating hole and the main valve port is disconnected, and meanwhile a sleeve upper cavity comes in communication with the main valve cavity through the second communicating hole; and in a case that the refrigerant flows reversely, the valve core seat moves upward to open the main valve port, and the main valve port comes in communication with the main valve cavity through the first communicating hole.

2. The electronic expansion valve according to claim 1, wherein the predetermined buffer distance ranges from 1 mm to 5 mm.

3. The electronic expansion valve according to claim 1, wherein the valve needle component is provided with an axial mounting hole, the screw rod position limiting portion extends into the axial mounting hole, and the valve needle position limiting portion is mounted at an open end of the axial mounting hole; and a distance between the bottom end of the screw rod and a bottom wall of the axial mounting hole forms the predetermined buffer distance.

4. The electronic expansion valve according to claim 3, wherein the predetermined buffer distance ranges from 1 mm to 5 mm.

5. The electronic expansion valve according to claim 3, wherein an outer wall of the valve needle component is provided with a valve needle stepped portion, the elastic component is sleeved on the outer wall of the valve needle component and has a lower end supported on the valve needle stepped portion; and a movable position limiting plate is sleeved on the screw rod at a portion outside the axial mounting hole, and when moving upward to an upper limit position, the position limiting plate abuts against a screw rod stepped portion of the screw rod; and an upper end of the elastic component abuts against the position limiting plate.

6. The electronic expansion valve according to claim 5, wherein the predetermined buffer distance ranges from 1 mm to 5 mm.

7. The electronic expansion valve according to claim 5, wherein the valve needle position limiting portion comprises a cylindrical guide portion, a top end of the cylindrical guide portion is provided with a bent portion which is bent outwards, and the bent portion abuts against a top-end wall of the axial mounting hole; and the bottom end of the screw rod is guided to pass through the cylindrical guide portion, and a bottom wall of the cylindrical guide portion is configured to retain the screw rod position limiting portion.

8. The electronic expansion valve according to claim 7, wherein the predetermined buffer distance ranges from 1 mm to 5 mm.

9. The electronic expansion valve according to claim 3, wherein the elastic component is arranged inside the axial mounting hole, and has an upper end abutting against the screw rod position limiting portion, and a lower end supported on the bottom wall of the axial mounting hole.

10. The electronic expansion valve according to claim 9, wherein the predetermined buffer distance ranges from 1 mm to 5 mm.

11. The electronic expansion valve according to claim 9, wherein the valve needle position limiting portion is a retaining block fixedly arranged on an inner wall of the axial mounting hole at the open end.

12. The electronic expansion valve according to claim 11, wherein the predetermined buffer distance ranges from 1 mm to 5 mm.

13. The electronic expansion valve according to claim 1, wherein when the valve core seat moves upward to open the main valve port, the valve needle component closes the valve core valve port, and the valve core seat closes the second communicating hole at the same time to disconnect the communication between the sleeve upper cavity and the main valve cavity.

14. The electronic expansion valve according to claim 1, wherein a lower end of the sleeve is supported by the valve seat, and the lower end of the sleeve surrounds the main valve port.

15. The electronic expansion valve according to claim 14, wherein the valve seat is provided with a vertical connecting port for mounting the vertical connecting pipe, and the lower end of the sleeve extends into the vertical connecting port and is supported by the vertical connecting port; and an inner wall of the lower end of the sleeve forms a main valve hole, and the main valve port is formed by an aperture at an upper portion of the main valve hole.

* * * * *